(No Model.)
A. M. FRASER.
CAR COUPLING.
No. 297,778. Patented Apr. 29, 1884.
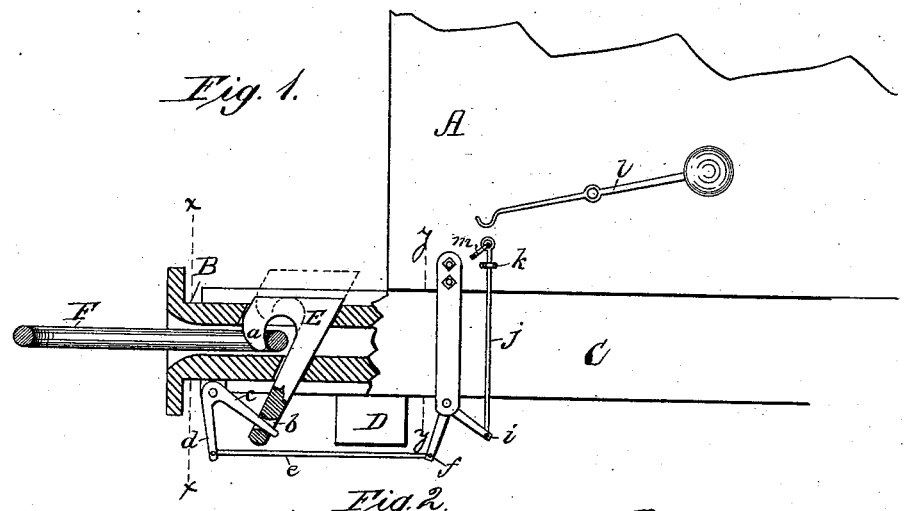
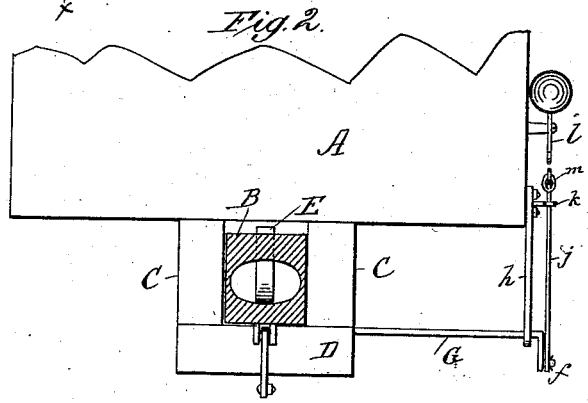
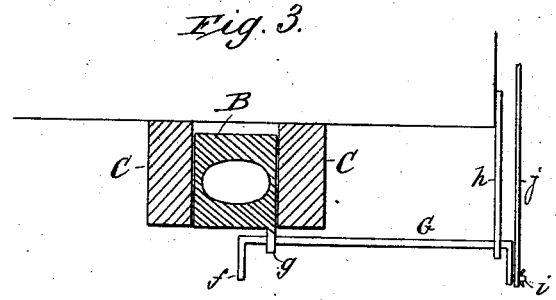
WITNESSES:
INVENTOR:
Alex. M. Fraser
BY Munn & Co
ATTORNEYS.

UNITED STATES PATENT OFFICE.

ALEXANDER MILLER FRASER, OF BATHURST, NEW BRUNSWICK, CANADA.

CAR-COUPLING.

SPECIFICATION forming part of Letters Patent No. 297,778, dated April 29, 1884.

Application filed February 21, 1884. (No model.)

*To all whom it may concern:*

Be it known that I, ALEXANDER MILLER FRASER, a subject of the Crown of Great Britain, residing at Bathurst, New Brunswick, Canada, have invented certain new and useful Improvements in Car-Couplings, of which the following is a description.

Figure 1 is a side view, partly in section, of my improved coupling. Fig. 2 is a front view, in section, through the line $x\,x$; and Fig. 3 is a section through the line $y\,y$.

The object of my invention is to provide an improved automatic car-coupling, which shall permit the ordinary draw-bar and link to be used, and thus secure the advantages of automatic coupling without materially interfering with adopted forms of construction.

It consists in the peculiar construction and arrangement of a sliding coupling-hook, and its combination with adjusting devices, as hereinafter fully described.

In the drawings, A represents the end of a car, and B is the draw-bar, which latter is of the usual form, and slides horizontally between the two side bars, C C, which are attached to the under side of the car, and project beyond the end of the same. The draw-bar rests upon the cross-bar D, attached to the under side of the two side bars, C C, and has the usual springs in the rear.

In accordance with my invention the upper side of the draw-bar is slotted lengthwise in the middle, and the lower side is perforated with an inclined hole, and into this slot and hole is dropped the sliding coupling-hook E, which in general shape resembles the figure 7. The front end or lip, $a$, of this hook is inclined rearwardly toward its lower edge, so as to cause it to rise as the link passes under, and the rear side of this lip is hook-shaped, to engage the link and carry the draft-strain. The shank of the hook passes obliquely through the hole in the bottom of the draw-bar, and the degree of its protrusion downwardly through said hole is limited by the lip $a$, which, in striking the bottom of the draw-bar, acts as a stop to further downward movement. The movement of this hook in the draw-bar is upwardly to the rear and downwardly to the front, as shown by dotted lines. When the link F enters the draw-bar, it strikes the inclined face $a$ of the hook, and, forcing the latter up, allows the link to pass lip $a$, after which the hook immediately drops to place again, and the link is caught behind the lip, thus coupling the cars.

For uncoupling the cars, the lower end of the coupling-hook is formed with a hole, $b$, through which there loosely plays the arm $c$ of an elbow-crank, which latter is fulcrumed in a double eye-bolt on the bottom of the draw-bar, and the other arm, $d$, of which crank is connected to the forward end of a pull-rod, $e$. At the rear this pull-rod is connected to the crank-arm $f$ of a transverse shaft, G, extending from the draw-bar to the side of the car. This shaft is journaled at one end in a downward projection, $g$, from the draw-bar, and at the other end is journaled in a hanger or downwardly-projecting bar, $h$, attached to the side of the car, the bearing being loose, to permit free play of the inner end of the shaft in moving with the draw-bar. On the outer end of this shaft is a crank, $i$, which is connected to a vertical rod, $j$, passing through an eye or keeper, $k$, and adapted to be connected with the end of the weighted lever $l$ by a link, $m$, which weighted lever is fulcrumed to the side of the car. Now, when it is desired to uncouple the car the rod $j$ is pulled up and the link $m$ hooked over the end of weighted lever $l$. This action rocks shaft G, pulls back rod $e$, and lifts coupling-hook, allowing the link to be pulled out, which position of the hook is maintained by the weight on lever $l$ until the car is to be automatically coupled again. When such automatic coupling is required, the link $m$ is disconnected from lever $l$, and the hook E drops from its own gravity.

Having thus described my invention, what I claim as new is—

1. The combination, with the draw-bar slotted with inclined guide-holes, of the coupling-hook E, having bevel-faced lip $a$, sliding loosely in inclined direction in said slot, as and for the purpose described.

2. The combination, with the draw-bar B, slotted as described, of the sliding coupling-hook E, having bevel-faced lip $a$, crank-arms $c\,d$, pull-rod $e$, shaft G, with arms $f$ and $i$, rod $j$, link $m$, and weighted lever $l$, as and for the purpose described.

The above specification of my invention signed by me in the presence of two subscribing witnesses.

ALEX. M. FRASER.

Witnesses:
EDWD. W. BYRN,
CHAS. A. PETTIT.